United States Patent [19]

Möckli

[11] 4,159,192
[45] Jun. 26, 1979

[54] TRANSFER DYES AND TRANSFER PRINTING PROCESS

[75] Inventor: Peter Möckli, Basel, Switzerland

[73] Assignee: Ciba-Geigy AG, Basel, Switzerland

[21] Appl. No.: 832,918

[22] Filed: Sep. 13, 1977

[30] Foreign Application Priority Data

Sep. 16, 1976 [CH] Switzerland ................ 11743/76

[51] Int. Cl.² ............................................. D06P 1/645
[52] U.S. Cl. ................................. 8/2.5 A; 8/177 R
[58] Field of Search .............................. 8/2.5, 2.5 A

[56] References Cited

U.S. PATENT DOCUMENTS

| | | | |
|---|---|---|---|
| 2,762,833 | 9/1956 | Heckert | 8/177 R |
| 3,992,140 | 10/1976 | Psaar | 8/2.5 A |

*Primary Examiner*—Donald Levy
*Attorney, Agent, or Firm*—Wenderoth, Lind & Ponack

[57] ABSTRACT

The invention relates to a process for printing flat-surface structures made from synthetic man-made or regenerated man-made polymer materials, for example polyester, polyacetate and preferably polyacrylonitrile fibres, by transfer printing, by means of auxiliary carriers which are printed with printing inks or printing pastes using dyes of the formula I

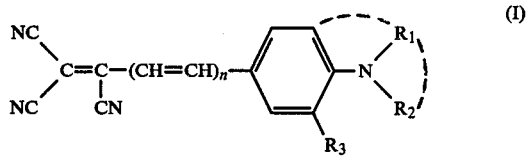

wherein
n is 0 or 1,
$R_1$ represents hydrogen, methyl, ethyl, propyl or butyl, branched or unbranched, while $R_1$ together with the phenyl nucleus can form a 6-membered heterocyclic ring,
$R_2$ represents hydrogen, methyl, ethyl, propyl, branched or unbranched, cyanomethyl, cyanoethyl, hydroxyethyl, chloroethyl, phenyl or benzyl, substituted or unsubstituted, and
$R_3$ represents hydrogen, methyl, ethyl and nitro, or
$R_1$ and $R_2$ together with the nitrogen atom to which they are attached form a 5- or 6-membered heterocyclic ring, in particular morpholine.

Furthermore the invention relates to novel dyes of the formulae

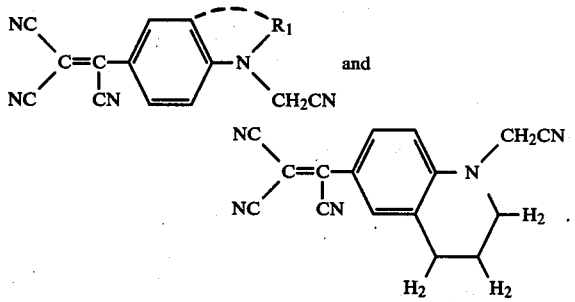

12 Claims, No Drawings

TRANSFER DYES AND TRANSFER PRINTING PROCESS

The present invention relates to a process for printing flat-surface structures made from synthetic man-made or regenerated man-made polymer materials, for example polyester, polyacetate and preferably polyacrylonitrile fibres, by transfer printing.

The process comprises the use of dyes of the formula I

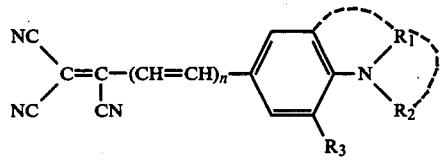

wherein
n is 0 or 1,
$R_1$ represents hydrogen, methyl, ethyl, propyl or butyl, branched or unbranched whilst $R_1$ together with the phenyl nucleus can form a 6-membered heterocyclic ring,
$R_2$ represents hydrogen, methyl, ethyl, propyl, branched or unbranched, cyanomethyl, cyanoethyl, hydroxyethyl, chloroethyl, phenyl or benzyl, substituted or unsubstituted, and
$R_3$ represents hydrogen, methyl, ethyl and nitro, or
$R_1$ and $R_2$ together with the nitrogen atom to which they are attached form a 5- or 6-membered heterocyclic ring, in particular morpholine with the proviso that when $R_1$ and $R_2$ together with the nitrogen atom to which they are attached form a 5- or 6-membered heterocyclic ring, $R_1$ is other than an alkylene group which, together with the phenyl nucleus and the nitrogen atom forms a 6-membered heterocyclic ring.

The phenyl or benzyl radical can contain for example the following further substituents: alkyl groups of 1 to 4 carbon atoms, in particular methyl, alkoxy groups of 1 to 4 carbon atoms, in particular methoxy, and halogen atoms, such as fluorine, bromine and, in particular, chlorine atoms.

As dyes of the formula I there are preferably used those in which $R_1$ is hydrogen and $R_2$ and $R_3$ have the given meanings, or those in which $R_1$ is alkyl of 1 to 4 carbon atoms and $R_3$ is hydrogen and $R_2$ has the given meaning.

The preferred dyes of the formula I comprise in particular the dyes of the following formula II

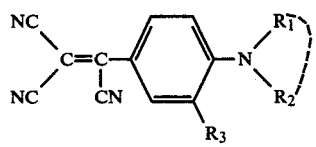

wherein $R_1$, $R_2$ and $R_3$ are as defined in formula I, dyes of the formula III

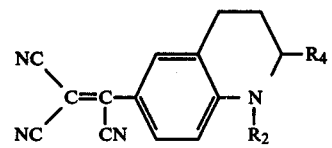

wherein $R_2$ is as defined in formula I and $R_4$ represents hydrogen or methyl, dyes of the formula IV

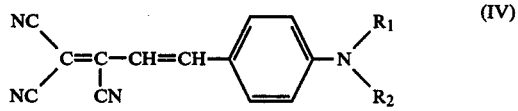

wherein $R_1$ and $R_2$ are as defined in formula I, and also the new dyes of the formula V

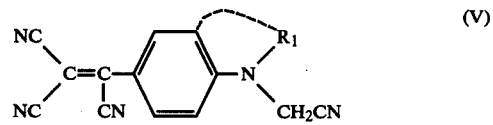

wherein $R_1$ is as defined in formula I, as well as the dyes of the formula

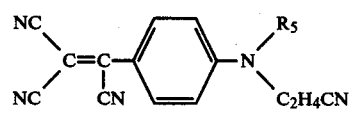

wherein $R_5$ represents methyl, ethyl, propyl or butyl.

It is a further object of the invention to provide printing inks and pastes for transfer printing, the carriers which are printed or impregnated with these dyes, and also the substrates which are coloured by these dyes by means of the transfer printing process.

It has been found that, surprisingly, strong and brilliant prints with excellent colouristic properties are obtained with the disperse dyes of the formula I on polyacrylonitrile fabric by the transfer printing method. In particular, the dyes of the formula I are distinguished by favourable transfer properties and the prints obtained therewith have very good light- and wetfastness properties.

It is known that, when applied to polyacrylonitrile, disperse dyes give only unsatisfactory results which, in addition, vary, depending on the type of polyacrylonitrile employed. Attempts have therefore already been made to obtain by the transfer printing process, using sublimable modified cationic dyes, the colouristic results which can be achieved therewith in conventional printing methods. These attempts, however, create a wide spectrum of problems, for example salt formation in the printing ink, too strong an alkaline character of the printed carriers etc.

The dyes of the formula I to be used according to the invention and the manufacture thereof are known in part from U.S. Pat. No. 2,762,810 and JACS, 80 (1958), pp. 2806-15, or they can be obtained by the described methods. On the other hand, the dyes of the formula V are new. These dyes can be obtained as in the cited patent or publication or by the methods of Example 67 and 68 of this application.

The transfer printing process is also generally known and is described in detail for example in French Pat. Nos. 1,223,330, 1,334,829 and 1,589,119. In this process, carriers which are printed with the suitable printing inks are brought into close contact with the substrate to be printed, whereupon the dye is transferred from the carrier to the substrate with the application of heat and optionally pressure.

Suitable carriers are flat-surface structures, such as paper, cellophane, metal sheets etc. (cf. British Pat. No. 1,190,889). The preferred carrier is paper.

The composition of the printing inks depends on the nature of the substrate, the printing procedure, the carrier material and on other factors. It is customary to use both aqueous printing inks and those on a solvent and, in particular, an alcohol basis. As a rule, they consist of at least one sublimable dye of the formula I, a binder, a solvent, and, if appropriate, thickeners, fillers and dispersants.

Depending on the printing method, suitable binders are those products which dry under chemical and physical conditions and are normally used in textile and paper printing.

Thickeners are those products which, even in low concentration, effect a marked increase in viscosity. Suitable thickeners are extender clays, starch ethers and alginates.

Dispersants are non-ionogenic compounds, such as alkylpolyglycol ethers and alkylphenol polyglycol ethers as well as ionic compounds, such as naphthalenesulphonic acid/formaldehyde condensates, ligninsulphonates and sulphite waste liquor products.

Suitable binders are those which, after printing and drying, form on the carrier, together with the dye and optionally other assistants, a thin elastic film which is so heat-resistant that it undergoes no or only very slight physical changes under the transfer conditions, i.e. at temperatures of up to 220° C. and a contact time of up to 120 seconds.

Suitable binders are: cellulose ethers, cellulose esters, polyvinyl alcohols, polyvinyl butyrals, polyvinyl acetals, and further homo- or copolymers or polycondensates based on acrylic acid, acrylate and maleic acid.

The nature of the solvent employed depends on the manner in which the carrier is printed and on the composition of the printing ink.

Suitable fillers are carbonates, sulphates, silicates, oxides etc. of alkali metals and alkaline earth metals and of aluminium and titanium. Fine-grained, natural calcium-magnesium carbonates (dolomite) and also fine-grained silica have proved particularly suitable.

The printing inks can be applied by the conventional printing methods (letterpress printing, planographic printing, intaglio or silk-screen/flat-screen printing).

Particularly suitable printing methods for producing printing paper carriers are intaglio and rotary screen printing. Intaglio printing is indicated where an extremely high image definition is required, while rotary-screen printing is advisable where small lengths are printed (i.e. where a small number of prints is required) and stringent demands are made of the image definition.

An intaglio ink usually contains, in addition to at least one sublimable dye of the formula I, a binder which is customarily used in intaglio printing, i.e. a natural or synthetic hard resin which dries under physical conditions, for example a cellulose ether, and an organic solvent which does not have too high a boiling point, such as ethanol or toluene.

For rotary screen printing on the other hand, preferably aqueous printing inks are used which contain—in addition to the dye—a filler, a thickener and also, if appropriate, organic solvents and/or dispersants, the weight ratio of binder to filler preferably being 1:6 to 1:8. Suitable binders are in particular those natural or synthetic products which are water-soluble (or solubilised by conventional saponification methods) and which dry under physical conditions and are normally used for obtaining flexographic and silkscreen printing inks.

Suitable transfer printing substrates are preferably flat-surface structures, such as webs, felt fabrics, carpets and, in particular, wovens and knits made of man-made synthetic or regenerated man-made material, for example polyester, polyacetate and especially polyacrylonitrile fibres, with the exception of polyamide fibres. The process of the present invention affords yellow to blue prints of good use properties.

The invention is illustrated by the following non-limitative Examples, in which the parts and percentages are by weight unless otherwise stated.

EXAMPLE 1

(a) With cooling, 5 parts of the dye of the formula

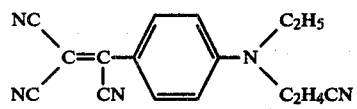

6.5 parts of ethyl cellulose and 88.5 parts of ethanol are ground for 2 hours in a ball mill and simultaneously homogenised. After removal of the grinding elements, a ready for use printing ink is obtained.

(b) The above printing ink is applied to the entire surface of a smooth parchment paper by printing and subsequently dried, affording a paper carrier suitable for transfer printing.

(c) A polyacrylonitrile fabric (ORLON ®) is laid on the pretreated carrier and brought into contact with the treated side thereof, whereupon carrier and fabric are heated for 30 seconds to 210° C. using a heating plate. A second, insulated plate, which is not heated, ensures uniform contact. The dyed fabric is then separated from the carrier.

A polyacrylonitrile fabric which is dyed a brilliant strong, red shade of good wet- and lightfastness properties is obtained.

EXAMPLE 2

(a) 75 parts of the dye of Example 1, 50 parts of an anionic dispersant, for example ligninsulphonate or a condensation product of naphthalenesulphonic acid and formaldehyde, and 100 parts of water are mixed. This mixture is brought to a finely dispersed form by grinding it for 10 hours in a ball mill. The resultant dispersion containing approx. 30% of crude colourant is storable.

(b) The above aqueous dispersion can be processed to a printing paste as follows:

50 to 200 parts are made into a paste with 400 parts of a 10% locust beam starch ether thickener and 550 to 400 parts of water.

(c) A paper is printed with the above paste by intaglio printing. This paper is brought into contact with a polyacrylonitrile textile fabric by exerting pressure for 15 to 60 seconds at 200° C. to give a clear, strong, red print of good wet- and lightfastness properties.

EXAMPLES 3 TO 55

Dyes of the formula II having the substituents $R_1$, $R_2$ and $R_3$ listed in Table 1 are used to prepare printing inks in accordance with Example 1(a), which are then printed on carriers obtained according to Example 1(b). After the transfer printing described in Example 1(c), the shades indicated in the last two columns of the table are obtained on polyester and polyacrylonitrile fabric.

Table 1

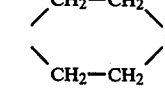

| No. | $R_1$ | $R_2$ | $R_3$ | Shade on polyacrylonitrile | polyester |
|---|---|---|---|---|---|
| 3 | —H | —CH$_3$ | —H | red | scarlet |
| 4 | —H | —C$_2$H$_5$ | —H | red | scarlet |
| 5 | —H | —C$_3$H$_7$ | —H | red | scarlet |
| 6 | —H | —C$_4$H$_9$ | —H | red | scarlet |
| 7 | —H | i-C$_4$H$_9$ | —H | red | scarlet |
| 8 | —H | sec-C$_4$H$_9$ | —H | red | scarlet |
| 9 | —H | —C$_2$H$_4$OH | —H | red | orange |
| 10 | —H | —C$_2$H$_4$Cl | —H | red | orange |
| 11 | —H | —C$_2$H$_4$CN | —H | orange | golden yellow |
| 12 | —H | -phenyl | —H | deep purplish red | claret |
| 13 | —H | -benzyl | —H | scarlet | reddish orange |
| 14 | —H | —CH$_3$ | —CH$_3$ | red | scarlet |
| 15 | —H | —C$_2$H$_5$ | —CH$_3$ | red | scarlet |
| 16 | —H | —C$_3$H$_7$ | —CH$_3$ | bluish red | red |
| 17 | —H | —C$_4$H$_9$ | —CH$_3$ | bluish red | red |
| 18 | —H | —C$_2$H$_4$OH | —CH$_3$ | red | red |
| 19 | —H | —C$_2$H$_4$Cl | —CH$_3$ | red | red |
| 20 | —H | —C$_2$H$_4$CN | —CH$_3$ | scarlet | orange |
| 21 | —H | -phenyl | —CH$_3$ | deep purplish red | red |
| 22 | —H | -benzyl | —CH$_3$ | red | scarlet |
| 23 | —H | —CH$_3$ | —C$_2$H$_5$ | red | scarlet |
| 24 | —H | —C$_2$H$_5$ | —C$_2$H$_5$ | bluish red | red |
| 25 | —H | —C$_3$H$_7$ | —C$_2$H$_5$ | bluish red | red |
| 26 | —H | —C$_4$H$_9$ | —C$_2$H$_5$ | bluish red | red |
| 27 | —H | —C$_2$H$_4$OH | —C$_2$H$_5$ | red | red |
| 28 | —H | —C$_2$H$_4$Cl | —C$_2$H$_5$ | red | red |
| 29 | —H | —C$_2$H$_4$CN | —C$_2$H$_5$ | scarlet | orange |
| 30 | —H | -phenyl | —C$_2$H$_5$ | deep purplish red | red |
| 31 | —H | -benzyl | —C$_2$H$_5$ | red | scarlet |
| 32 | —CH$_3$ | —CH$_3$ | —H | red | red |
| 33 | —CH$_3$ | —C$_2$H$_5$ | —H | red | red |
| 34 | —CH$_3$ | —C$_3$H$_7$ | —H | red | bluish red |
| 35 | —CH$_3$ | —C$_4$H$_9$ | —H | red | bluish red |
| 36 | —CH$_3$ | —C$_2$H$_4$OH | —H | red | red |
| 37 | —CH$_3$ | —C$_2$H$_4$Cl | —H | bluish red | reddish orange |
| 38 | —CH$_3$ | —C$_2$H$_4$CN | —H | red | orange |
| 39 | —CH$_3$ | -phenyl | —H | deep purplish red | claret |
| 40 | —CH$_3$ | -benzyl | —H | bluish red | red |
| 41 | —C$_2$H$_5$ | —C$_2$H$_5$ | —H | deep purplish red | bluish red |
| 42 | —C$_2$H$_5$ | —C$_3$H$_7$ | —H | deep purplish red | bluish red |
| 43 | —C$_2$H$_5$ | —C$_4$H$_9$ | —H | deep purplish | bluish red |
| 44 | —C$_2$H$_5$ | —C$_2$H$_4$OH | —H | red deep purplish red | red |
| 45 | —C$_2$H$_5$ | —C$_2$H$_4$Cl | —H | bluish red | scarlet |
| 46 | —C$_2$H$_5$ | —C$_2$H$_4$CN | —H | red | orange |
| 47 | —C$_2$H$_5$ | -phenyl | —H | deep purplish red | claret |
| 48 | —C$_2$H$_5$ | -benzyl | —H | bluish red | red |
| 49 | —C$_3$H$_7$ | —C$_3$H$_7$ | —H | deep purplish red | bluish red |
| 50 | n-C$_4$H$_9$ | —C$_2$H$_4$CN | —H | red | scarlet |
| 51 | CH$_2$—CH$_2$—O—CH$_2$—CH$_2$ (morpholino) | | —H | red | scarlet |
| 52 | " | | —NO$_2$ | orange | orange |
| 53 | —CH$_3$ | —CH$_3$ | —NO$_2$ | orange | orange |
| 54 | —H | —CH$_3$ | —NO$_2$ | golden yellow | yellow |
| 55 | —CH$_3$ | —CH$_2$CN | —H | orange | golden yellow |

EXAMPLES 56 TO 63

Dyes of the formula III having substituents $R_2$ and $R_4$ listed in Table 2 are used to prepare printing inks in accordance with Example 1(a), which are then printed on carriers obtained according to Example 1(b). After the transfer printing described in Example 1(c), the shades indicated in the last two columns of the table are obtained on polyester and polyacrylonitrile fabric.

Table 2

(III)

| No. | $R_2$ | $R_4$ | shade on polyacrylonitrile | polyester |
|---|---|---|---|---|
| 56 | —H | —H | bluish red | red |
| 57 | —H | —CH$_3$ | bluish red | red |
| 58 | —C$_2$H$_5$ | —H | violet | bluish red |
| 59 | n-C$_3$H$_7$ | —H | violet | bluish red |
| 60 | n-C$_4$H$_9$ | —H | violet | bluish red |
| 61 | Benzyl | —H | reddish | red |
| 62 | —CH$_2$CN | —H | scarlet | orange |
| 63 | —C$_2$H$_4$CN | —H | deep purplish red | red |

EXAMPLES 64 TO 66

Dyes of the formula IV having the substituents $R_1$ and $R_2$ listed in Table 3 are used to prepare printing inks in accordance with Example 1(a), which are then printed on carriers obtained according to Example 1(b). After the transfer printing described in Example 1(c), the shades indicated in the last two columns of the table are obtained on polyester and polyacrylonitrile fabric.

Table 3

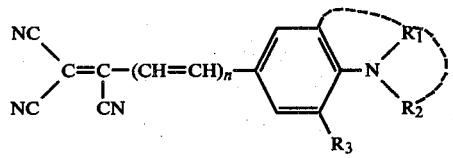

| No. | R₁ | R₂ | shade on polyacrylonitrile | polyester |
|---|---|---|---|---|
| 64 | —CH₃ | —CH₃ | blue | reddish blue |
| 65 | —CH₃ | —C₂H₄CN | blue | violet |
| 66 | —C₂H₅ | —C₂H₄CN | blue | violet |

EXAMPLE 67

Manufacturing Example for the dye of the formula

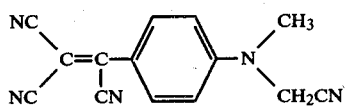

146 parts of N-methyl-N-cyanomethyl-aniline are stirred in 200 parts of dimethyl formamide and then a total amount of 130 parts of tetracyanoethylene are added in portions. An olive-coloured solution forms initially. After heating to 55° C. and stirring for 30 minutes at this temperature, the solution gradually turns a deep orange colour. The solution is cooled to room temperature and diluted with water, whereupon the dye precipitates immediately. The dye is collected by filtration and washed with approx. 200 parts of a mixture of ethanol and water (1:1) and then dried, affording 90 parts of a bluish red powder with a melting point of 150°–153° C. This dye gives orange shades on polyacrylonitrile and golden yellow shades on polyester.

EXAMPLE 68

Manufacturing Example for the dye of the formula

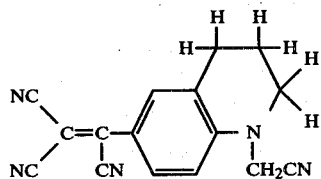

(1) N-cyanomethyl-1,2,3,4-tetrahydroquinoline 162 parts of 1,2,3,4-tetrahydroquinoline, 126 parts of chloroacetonitrile and 66 parts of sodium carbonate are stirred for 6 hours at a temperature of 105°–115° C. After cooling, the thick brown suspension is diluted with methylene chloride and filtered. After washing thoroughly with methylene chloride, the filtrate is concentrated as far as possible in a water jet vacuum and the residue is subsequently distilled. The main fraction boils at 148°–150° C. at a pressure of 1 torr.

Yield: 145 parts.

(2) Dye 44 parts of N-cyanomethyl-1,2,3,4-tetrahydroquinoline, 300 parts of dimethyl formamide and 33.5 parts of tetracyanoethylene are mixed and then heated cautiously until a deep red solution has formed. After cooling, the dye is precipitated with water and worked up as described in Example 67.

Yield: 63 parts of a brown powder with a melting point of 200° to 201° C.

This dye gives scarlet shades on polyacrylonitrile and orange shades on polyester fabric.

What we claim is:

1. In a process for the sublimation transfer printing of flat-surface structures of synthetic man-made or regenerated man-made polymer materials which comprises bringing a carrier printed with suitable printing ink into contact with the structure to be printed, applying heat to the said carrier and structure assembly while in contact to effect sublimation transfer or dyestuff from the carrier to the structure and separating the carrier from the printed structure, the improvement according to which the printed carrier carries at least one dyestuff of the formula

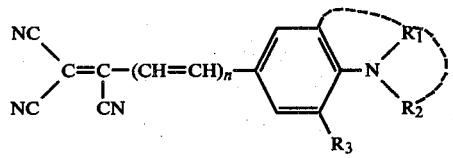

wherein n is 0 or 1,

R₁ represents hydrogen, methyl, ethyl, propyl or butyl, said alkyl moieties being branched or unbranched or R₁ is an alkylene group which, together with the phenyl nucleus and the nitrogen to which it is attached, forms a 6-membered heterocyclic ring, R₂ represents hydrogen, methyl, ethyl, propyl, said alkyl moieties being branched or unbranched, cyanomethyl, cyanoethyl, hydroxyethyl, chloroethyl, phenyl or benzyl, said phenyl and benzyl moieties being unsubstituted or substituted by alkyl of 1 to 4 carbon atoms, alkoxy of 1 to 4 carbon atoms or halogen and R₃ represents hydrogen, methyl, ethyl and nitro, or R₁ and R₂ together with the nitrogen atom to which they are attached form a 5- or 6-membered heterocyclic ring, with the proviso that when R₁ and R₂ together with the nitrogen atom to which they are attached form a 5- or 6-membered heterocyclic ring, R₁ is other than an alkylene group which, together with the phenyl nucleus and the nitrogen atom forms a 6-membered heterocyclic ring.

2. A process according to claim 1 wherein R₁ represents hydrogen and n is 0.

3. A process according to claim 1 wherein n is 0, R₁ represents alkyl of 1 to 4 carbon atoms and R₃ represents hydrogen.

4. A process according to claim 1 wherein the dyestuff is of the formula

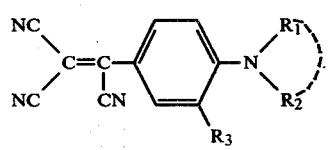

5. A process according to claim 1 wherein the dyestuff is of the formula

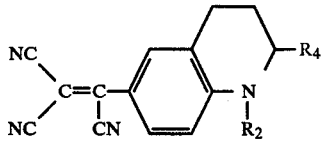

and R4 represents hydrogen or methyl.

6. A process according to claim 1 wherein the dyestuff is of the formula

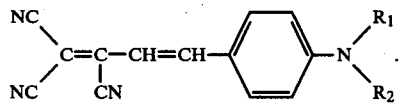

7. A process according to claim 1 wherein the dyestuff is of the formula

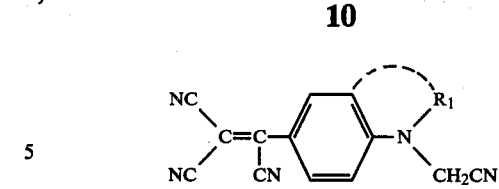

8. A process according to claim 1 wherein the dyestuff is of the formula

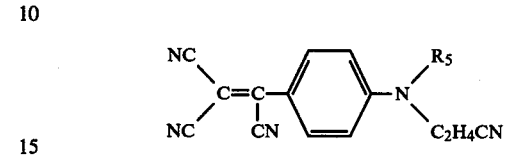

wherein $R_5$ represents methyl, ethyl, propyl or butyl.

9. A process according to claim 1 wherein polyacrylonitrile material is printed.

10. A process according to claim 1 wherein polyester material is printed.

11. A process according to claim 1 wherein polyacetate material is printed.

12. A process according to claim 4 wherein the group

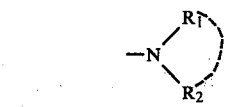

is morpholino.